United States Patent [19]

Iino

[11] Patent Number: 4,837,551
[45] Date of Patent: Jun. 6, 1989

[54] DISPLAY APPARATUS FOR AUTOMOTIVE VEHICLE

[75] Inventor: Tadashi Iino, Susono, Japan
[73] Assignee: Yazaki Corporation, Japan
[21] Appl. No.: 151,632
[22] Filed: Feb. 3, 1988
[51] Int. Cl.⁴ .............................................. B60Q 1/00
[52] U.S. Cl. .................................... 340/705; 340/461; 353/14
[58] Field of Search ................... 340/52 R, 52 F, 103, 340/104, 705, 980, 97, 98, 669, 671; 180/282; 350/605

[56] References Cited

U.S. PATENT DOCUMENTS

| | | | |
|---|---|---|---|
| 4,711,544 | 12/1987 | Iino et al. | 353/14 |
| 4,716,458 | 12/1987 | Heitzman et al. | 340/97 |
| 4,742,389 | 5/1988 | Schiffman | 340/705 |
| 4,746,206 | 5/1988 | Kusztos et al. | 350/605 |

OTHER PUBLICATIONS

International Publication, William Tate, Automatic Mirror Rotating System, 9-25-86.

*Primary Examiner*—Joseph A. Orsino, Jr.
*Assistant Examiner*—Annie H. Chau
*Attorney, Agent, or Firm*—Wigman & Cohen

[57] ABSTRACT

In a display apparatus for an automotive vehicle including a projector disposed at the ceiling of the automotive vehicle to project display images and a half mirror for reflecting projected display images to the driver, an angular position of the half mirror surface from the lateral direction of the vehicle is automatically adjusted according to vehicle lateral acceleration. Therefore, the driver can appropriately see virtual display images ahead of the half mirror along the driver's eye direction variable according to vehicle lateral acceleration.

8 Claims, 6 Drawing Sheets

DISPLAY APPARATUS FOR AUTOMOTIVE VEHICLE

BACKGROUND OF THE INVENTION

1. Field of the Invention

The present invention relates generally to a display apparatus for an automotive vehicle and more specifically to a head up display apparatus by which the driver can see display images projected from a projector and reflected from a reflector disposed in front of the windshield, as virtual images, in superimposition upon the outside view through the windshield.

2. Description of the Prior Art

The same applicant has recently proposed a novel head up display apparatus for an automotive vehicle which comprises a projector disposed at a ceiling of the automotive vehicle to project display images and a half reflector disposed on a dashboard of the vehicle to reflect the display images projected by the projector and to transmit the outside view to the driver, simultaneously. The half reflector is a half mirror or a hologram plate. The above display apparatus can provide stable display images without being subjected to external sunlight, being free from dimensional restriction due to small dashboard inside space and high in heat radiation efficiency.

In the above display apparatus, although the half reflector is designed so that the size becomes as small as possible, when the half reflector is disposed in front of the driver, since the frontward field of vision is obstructed, the presence of the half mirror is not preferable from a standpoint of safety in driving a vehicle.

To overcome this problem with safety, the half reflector is preferably disposed on the dashboard being a little dislocated from the driver's front toward the longitudinal vehicle center. In the above-mentioned arrangement of the half reflector, however, there still exists a problem in that the driver cannot appropriately see display images reflected from the half reflector when the driver's body is tilted inward or outward due to vehicle running along a sharp curved road or when the distance between the driver and the half reflector differs according to driver's physique.

The above-mentioned problems will be described in further detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a display apparatus for an automotive vehicle including a projector and a half mirror, in which an angular position of the half mirror surface from the lateral direction of the vehicle can be automatically adjusted according to vehicle lateral acceleration so that the driver can appropriately see virtual display images ahead of the half mirror along the driver's eye direction variable according to vehicle lateral acceleration.

To achieve the above-mentioned object, a display apparatus for an automotive vehicle according to the present invention comprises: (a) projecting means, disposed in a passenger compartment of the automotive vehicle, for projecting display images; (b) half mirror reflecting means for reflecting the display images projected by said projecting means to a driver; (c) actuator means, coupled to said half mirror reflecting means, for turning said half mirror reflecting means to adjust an angular position of a reflection surface of said half mirror reflecting means from a lateral direction of the vehicle; (d) sensor means for detecting a change in vehicle travel direction; and (e) control means, coupled to said actuator means and said sensor means, for controlling the angular position of said half mirror reflecting means according to vehicle lateral acceleration detected by said sensor means to automatically form virtual display images ahead of said half mirror reflecting means in a driver's eye direction variable according to vehicle lateral acceleration.

Further, it is preferable to provide another actuator means, coupled to said half mirror reflecting means, for tilting said half mirror reflecting means to manually adjust a tilt angle of said half mirror reflecting means so that display images can be correctly reflected from said half mirror reflecting means to the driver according to a driver's sitting height.

BRIEF DESCRIPTION OF THE DRAWINGS

The features and advantages of the display apparatus for an automotive vehicle according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

Figure 1A:
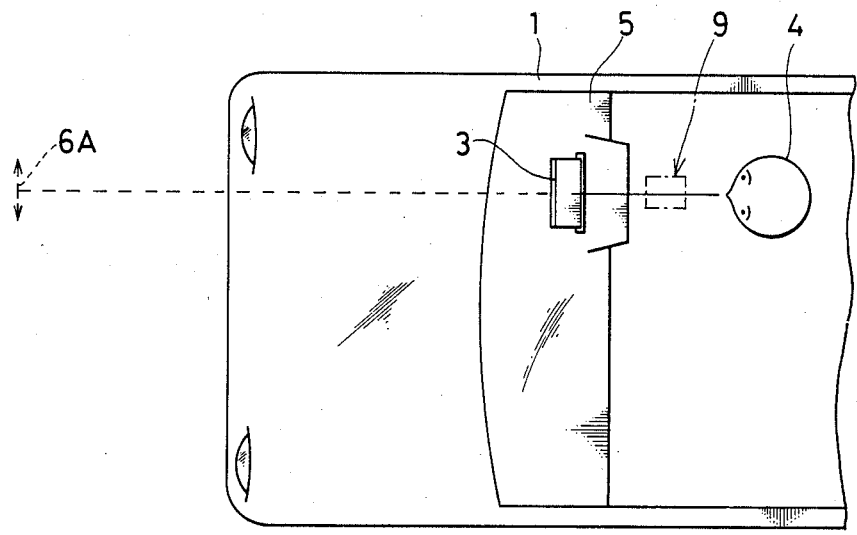
FIG. 1(A) is a diagrammatical top view for assistance in explaining a problem involved in a display apparatus for an automotive vehicle.
Figure 1B:
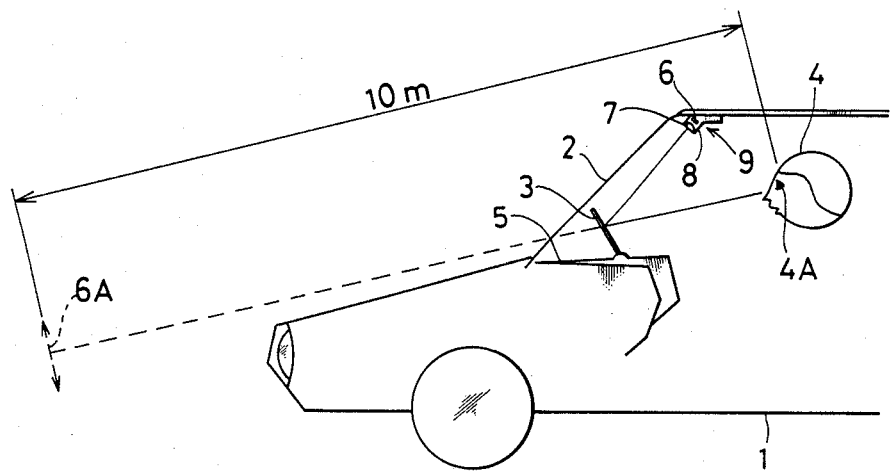
FIG. 1(B) is a diagrammatical side view of the display apparatus shown in FIG. 1(B).

FIGS. 1(A) and (B) show a display apparatus for an automotive vehicle disclosed in the copending application filed by the same applicant. In the drawings, the display apparatus comprises a half reflector unit 3 disposed on a dashboard 5 in front of a windshield 2 of an automotive vehicle 1 and a projector unit 9 attached to a ceiling of the vehicle 1. The half reflector unit 3 is a half mirror, for instance, having appropriate reflectivity and transmissivity. The projector unit 9 is made up of a display device 6 for displaying various information such as vehicle speed, for instance, related to the vehicle, an optical element 7 such as convex lens, for instance, for projecting display images to the reflector unit 3, and a casing 8 for housing the display device 6 and the optical element 7. In this display apparatus, a virtual image 6A is focused at a position about 10 m away from the eye 4A of the driver 4 and ahead of the windshield 2 of the vehicle 1, for instance, as shown in FIG. 1(B). Therefore, the driver 4 can see display images projected from the projector unit 9 and reflected from the reflector unit 3 about 10 m ahead of the driver's eye 4A in superimposition upon the outside view.

Although the size of the half reflector unit 3 is minimized, since the reflector unit 3 is disposed in front of the driver 4, there exists a problem in that the driver's field of vision is obstructed and therefore the reflector unit 3 is not preferable from a standpoint of safety in driving the vehicle.

Figure 1C:
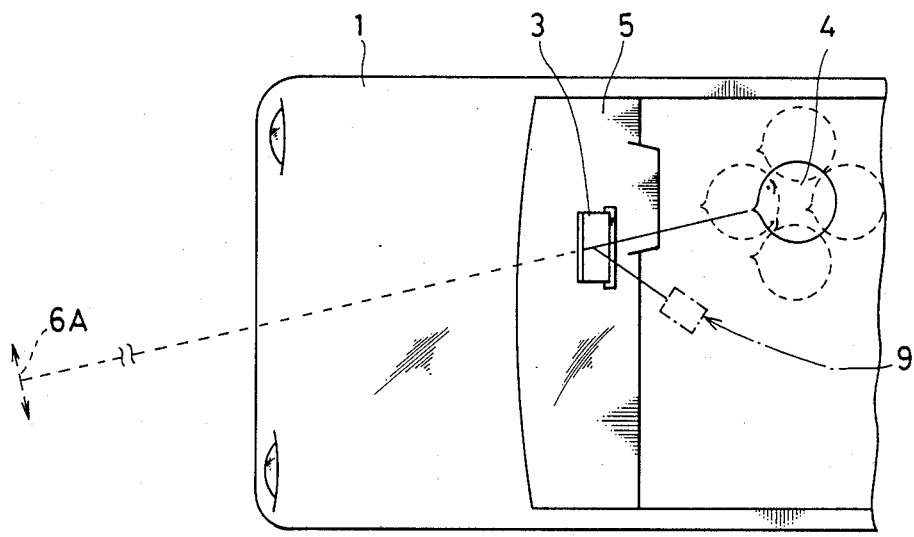
FIG. 1(C) is another diagrammatical top view for assistance in explaining another problem involved in the display apparatus for an automotive vehicle.

The above-mentioned problem can be solved by disposing the half reflector unit 3 on the dashboard 5 at a position a little dislocated from the driver's front to the vehicle center as shown in FIG. 1(C), and the projector unit 9 at the ceiling of the vehicle. In an example shown in FIG. 1(C), when the driver 4 is correctly positioned as shown by solid lines in FIG. 1(C), he can see display images 6A projected by the projector unit 9 and reflected from the half reflector unit 3. However, when the position of the driver 4 is disclosed as shown by the dashed lines in FIG. 1(C), as when the vehicle is running along a sharp curved road or when the driver takes a seat out of the center thereof due to the driver's habit of seating, there exists another problem in that the driver 4 cannot correctly recognize display images reflected from the half reflector unit 3.

In view of the above description, reference is now made to an embodiment of the display apparatus for an automotive vehicle according to the present invention.

Figure 2:
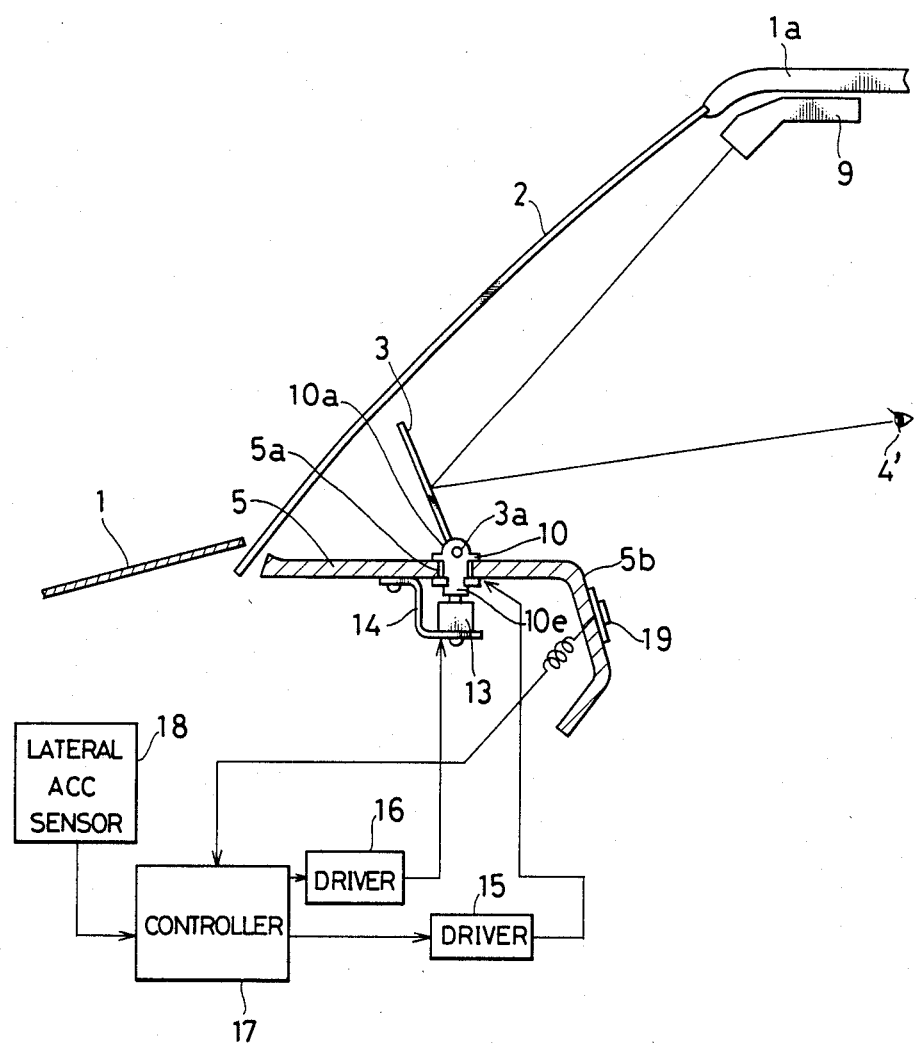
FIG. 2 is an enlarged diagrammatical side view, including a block diagram; showing an embodiment of a display apparatus for an automotive vehicle according to the present invention.
Figure 3:
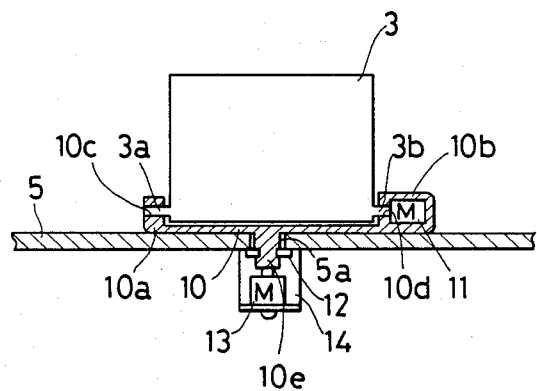
FIG. 3 is a partial front view of the display apparatus shown in FIG. 2.

In FIGS. 2 and 3, the display apparatus comprises roughly a half-mirror reflector unit, a projector unit, and a control section. Further, the reflector unit is automatically turned adjustably rightward or leftward to adjust an angular position of a surface of the half mirror reflector unit from a lateral direction of the vehicle under control of the control section according to vehicle lateral acceleration and manually tilted upward or downward to adjust a tilt angle of the half mirror reflector unit according to the driver's sitting height.

In FIG. 3, a square half-mirror reflector unit 3 is formed with two pivotal axles 3a and 3b each projecting from the lower side portion thereof. These two pivotal axles 3a and 3b are inserted into bearing holes 10c and 10d respectively formed at a pair of support arms 10a and 10b of the support member 10 to pivotably support the reflector unit 3 by the support member 10.

This support member 10 is formed with a projecting rotary shaft 10e at the lower middle portion thereof. This rotary shaft 10e is inserted into a bearing hole 5a formed vertically in the dashboard 5 so as to be pivotably support, and retained by a retainer ring 12 engaged with the rotary shaft 10e from the inside of the dashboard 5. The pivotal axle 3b is connected to an actuator such as a motor 11 disposed coaxially with the bearing hole 10d of the support arm 10b in order to tilt the reflector unit 3 upward or downward.

Further, the rotary shaft 10e is connected to another actuator such as a motor 13 for turning (pivoting) the reflector unit 13 rightward or leftward to adjust an angular position of a surface of the half mirror reflector unit 3 from the lateral direction of the vehicle. The motor 13 is fixed to a support plate 14 to the inside of the dashboard 5.

Figure 4:
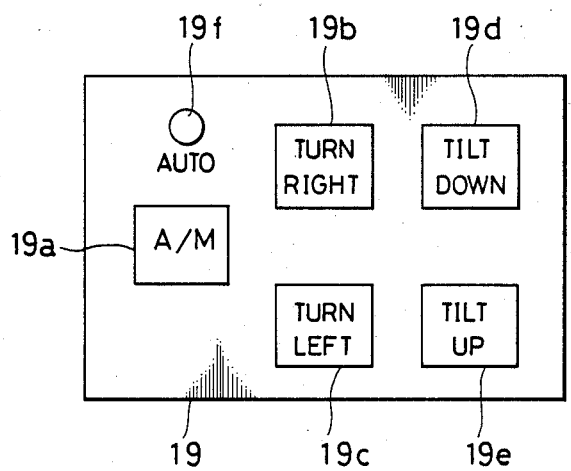
FIG. 4 is an illustration showing an operation panel of the apparatus shown in FIG. 2.

In FIG. 2, the control section includes a first motor driver 16, a second motor driver 15, a controller 17, a lateral acceleration sensor 18, and an operation panel 19. The first motor driver 16 is connected to the first actuator 13 and the second motor driver 15 is connected to the second actuator 11. The driver 16 is operated under control of the controller 17 to rotate the motor 13 in the forward or reverse direction. The lateral acceleration sensor 18 detects the direction (rightward or leftward) and magnitude of lateral vehicle acceleration or centrifugal force applied to the veicle when the vehicle is running along a sharp curved road and generates a signal corresponding thereto. The operation panel 19 disposed on the surface of the dashboard 5 includes an auto/manual selector button (A/M) 19a, an auto indicator lamp (AUTO) 19f, a reflector turn-rightward button (TURN RIGHT) 19b, a reflector turn-leftward button (TURN LEFT) 19c, a reflector tilt-downward button (TILT DOWN) 19d, and a reflector tilt-upward button (TILT UP) 19e, as depicted in FIG. 4.

Further, although not shown, there is provided an angular position sensor for detecting an angular position of a surface of the half mirror reflector unit 3 from a lateral direction of the vehicle.

Furthermore, the controller 17 stores a table which lists preferable angular positions of the reflector unit 3 according to detected vehicle lateral accelerations.

On the other hand, at the ceiling 1a of the vehicle 1, a projector unit 9 is fixed so as to project display images to the reflector unit 3.

The operation of the display apparatus of the present invention will be described hereinbelow: when the auto/manual selector switch 19a is set to auto and therefore the auto indicator lamp 19f comes on, the vehicle acceleration sensor 18 applies a vehicle acceleration signal to the controller 17 when accelerated. In response to this acceleration signal, the controller 17 selects predetermined data indicative of an appropriate angular position of the reflector member 3 dislocated from the lateral direction of the vehicle in accordance with table look-up method, and generates a control signal to the actuator driver 16 on the basis of the selected data. Therefore, the reflector unit 3 is adjustably turned to an appropriate angular position according to the detected vehicle acceleration, until the selected data matches an angular position detected by the angular position sensor (not shown) provided for the actuator 13. In the above-mentioned operation, the reflector unit 3 is controlled to a target angular position selected from a look-up table in response to the feedback value of the angular position sensor by feedback control method. Without being limited thereto, however, it is also possible to control the reflector unit 3 to a target angular position selected from a look-up table by direct forward control method. In this direct control method, the actuator such as a step motor 13 is directly moved to the target position without providing the above-mentioned angular position sensor (not shown).

Figure 5A:
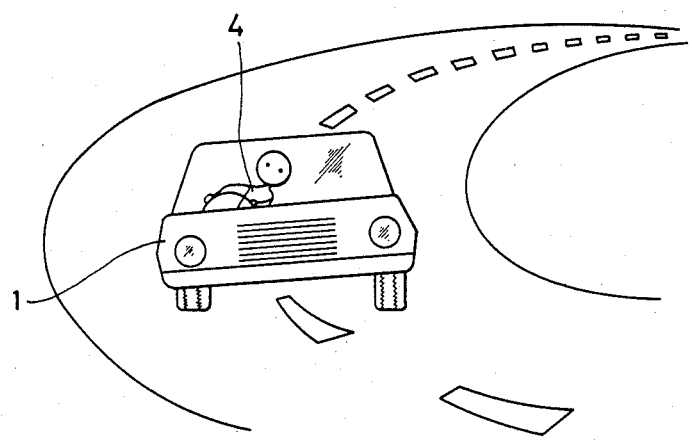
FIG. 5(A) is an illustration for assistance in explaining the driver's body inclination when the vehicle is running along a sharp curved road.
Figure 5B:
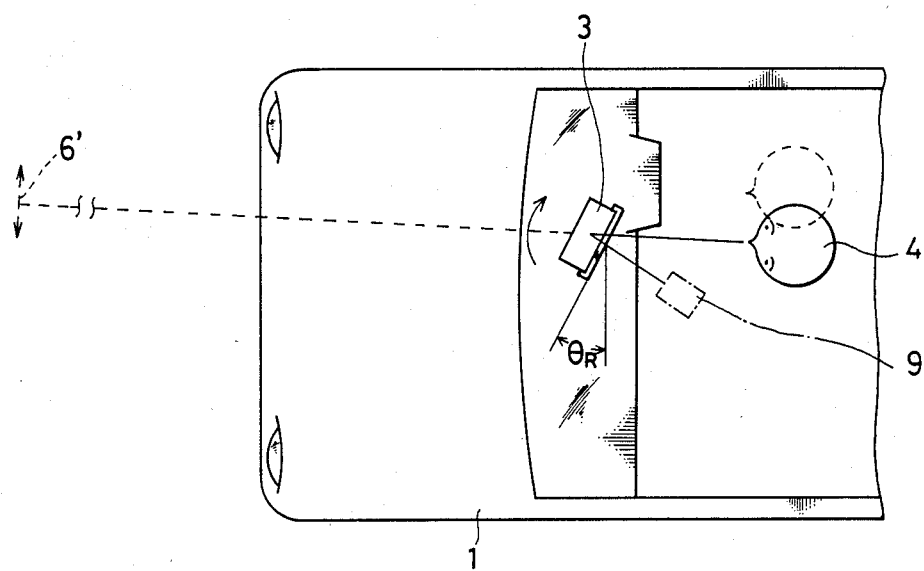
FIG. 5(B) is a diagrammatical top view for assistance in explaining the driver's head position when the vehicle is running along a sharp curved road.

FIG. 5(A) shows an example where the vehicle 1 is running along a leftward curved road. In this case, since a rightward lateral acceleration is applied to the vehicle or the driver due to a centrifugal force applied to the vehicle or the driver, the driver 4 automatically tends to tilt his body in the leftward direction, as shown by the solid lines in FIG. 5(B). In the display apparatus of the present invention, however, since the reflector unit 3 is turned in the rightward direction (clockwise in FIG. 5(B)) according to the applied vehicle acceleration direction and magnitude detector by the sensor 18, it is possible to appropriately reflect the display images projected from the projector unit 9 toward the driver 4. In the above automatic angular position adjustment of the reflector unit 3, the reflector unit 3 is pivoted in the rightward direction (clockwise) by an angle $\theta_R$ selected from a look-up table on the basis of the detected lateral acceleration value.

Figure 6:
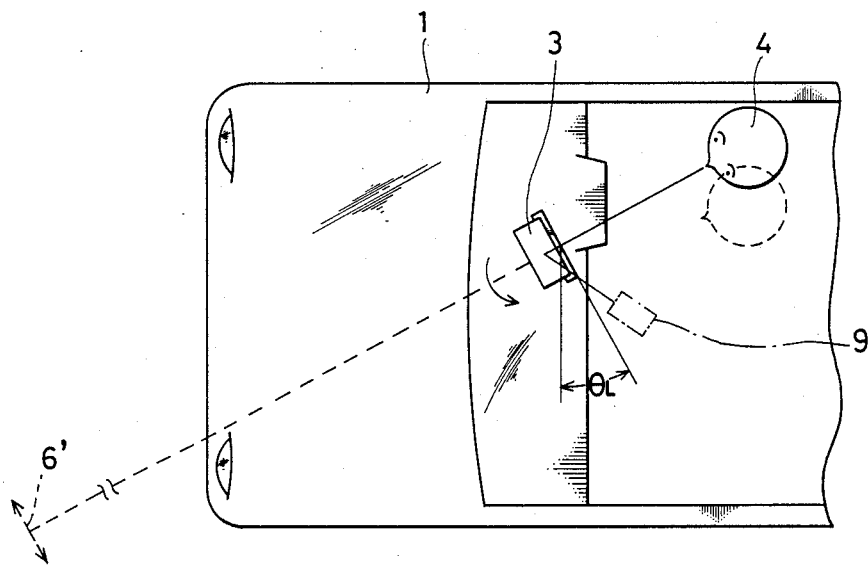
FIG. 6 is a diagrammatical top view for assistance in explaining the driver's head position when the vehicle is running along another sharp curved road.

Similarly, FIG. 6 shows an example where the vehicle 1 is running along a rightward curved road. In this case, since a leftward lateral acceleration is applied to the driver, the driver automatically tilts his body in the rightward direction as shown, so that the reflector unit 3 is turned in the leftward direction (counterclockwise in FIG. 6) by an angle $\theta_L$ selected from a look-up table on the basis of the detected lateral acceleration value.

On the other hand, when the auto/manual selector switch 19a is set to manual and therefore the auto indicator lamp 19f goes off, the reflector unit 3 can be turned rightward or leftward or tilted upward or downward by depressing the buttons 19b to 19e, irrespective of vehicle lateral acceleration, so that the driver can adjustably move the reflector unit 3 in manual operation. In particular, the driver can adjust the reflection direction of the reflector unit 3 according to the driver's sitting height by depressing the buttons 19d and 19e to tilt the reflector unit 3 upward or downward so as to correctly face the driver 4.

In the above description, the projector is disposed at a ceiling of the automotive vehicle. However, without being limited thereof, it is possible to dispose the projector at an appropriate position within the passenger compartment by use of appropriate optical means, where necessary.

Further, in the above description, the vehicle lateral acceleration sensor is explained by way of example. However, without being limited thereto, it is possible to utilize various sensors which can detect a change in vehicle travel direction such as a steering wheel angular position sensor.

As described above, in display apparatus of the present invention, since the reflector unit can be automatically turned rightward or leftward according to a detected vehicle lateral acceleration, the driver can appropriately see the display images projected by the projector unit and reflected by the reflector unit, even if the driver's body is tilted in either direction when the vehicle is running along a sharp curved road, thus improving the driving safety and display recognizability simultaneously. Further, the tilt angle of the half mirror reflector unit is adjustable manually according to the driver's sitting height.

What is claimed is:

1. A display apparatus for an automotive vehicle, comprising:
    (a) projecting means, disposed in a passenger compartment of the automotive vehicle, for projecting display images;
    (b) half mirror reflecting means for reflecting the display images projected by said projecting means to a driver;
    (c) actuator means, coupled to said half mirror reflecting means, for turning said half mirror reflecting means to adjust an angular position of a reflection surface of said half mirror reflecting means from a lateral direction of the vehicle;
    (d) sensor means for detecting vehicle lateral acceleration; and
    (e) control means, coupled to said actuator means and said sensor means, for controlling the angular position of said half mirror reflecting means according to vehicle lateral acceleration detected by said sensor means to automatically form virtual display images ahead of said half mirror reflecting means in a driver's eye direction variable according to vehicle lateral acceleration.

2. The display apparatus for an automotive vehicle, as set forth in claim 1, which further comprises another actuator means, coupled to said half mirror reflecting means, for tilting said half mirror reflecting means to manually adjust a tilt angle of said half mirror reflecting means so that display images can be correctly reflected from said half mirror reflecting means to the driver according to a driver's sitting height.

3. The display apparatus for an automotive vehicle, as set forth in claim 1, wherein said control means controls said half mirror reflecting means in accordance with table look-up method on the basis of detected vehicle lateral acceleration.

4. The display apparatus for an automotive vehicle, as set forth in claim 3, wherein said control means controls said half mirror reflecting means in direct forward control method.

5. The display apparatus for an automotive vehicle, as set forth in claim 3, wherein said actuator means comprises a sensor for detecting an angular position of a reflection surface of said half mirror reflecting means to control said half mirror reflecting means in feedback control method.

6. A display apparatus for an automotive vehicle having a passenger compartment and a driver, comprising:
    (a) projecting means disposed in the passenger compartment of the automotive vehicle, for projecting display images;
    (b) half-mirror reflecting means having a reflection surface for reflecting the display images projected by said projecting means to a driver;
    (c) actuator means coupled to said half-mirror reflective means, for turning said half-mirror reflecting means to adjust an angular position of a reflection surface of said half-mirror reflecting means from a lateral direction of the vehicle;
    (d) sensor means for detecting vehicle lateral acceleration; and
    (e) control means coupled to said actuator means and said sensor means, for controlling the angular position of said half-mirror reflecting means in accordance with a look-up table of values on the basis of detected vehicle lateral acceleration detected by said sensor means to automatically form virtual display images ahead of said half-mirror reflecting means in a driver's eye direction variable according to vehicle lateral acceleration.

7. The display apparatus for an automotive vehicle, as set forth in claim 6, wherein said control means controls said half-mirror reflecting means by direct forward control.

8. The display apparatus for an automotive vehicle, as set forth in claim 6, wherein said actuator means comprises a sensor for detecting an angular position of a reflection surface of said half-mirror reflecting means to control said half-mirror reflecting means by feedback control.

* * * * *

UNITED STATES PATENT AND TRADEMARK OFFICE
CERTIFICATE OF CORRECTION

PATENT NO.   :   4,837,551
DATED        :   June 6, 1989
INVENTOR(S)  :   Tadashi IINO It is certified that error appears in the above-identified patent and that said Letters Patent is hereby corrected as shown below:

Column 3, line 28, "disclosed" should be --dislocated--;

line 67, "unit 13" should be --unit 3--;

Column 4, line 14, "veicle" should be --vehicle--.

Claim 6, lines 10 and 11, "reflective" should be --reflecting--.

Signed and Sealed this

Twentieth Day of March, 1990

Attest:

JEFFREY M. SAMUELS

Attesting Officer

Acting Commissioner of Patents and Trademarks